United States Patent
Kimoto (10) Patent No.: US 11,309,694 B2
(45) Date of Patent: Apr. 19, 2022

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Yuichi Kimoto, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/057,865

(22) PCT Filed: May 16, 2019

(86) PCT No.: PCT/JP2019/019440
§ 371 (c)(1),
(2) Date: Nov. 23, 2020

(87) PCT Pub. No.: WO2019/235156
PCT Pub. Date: Dec. 12, 2019

(65) Prior Publication Data
US 2021/0119428 A1 Apr. 22, 2021

(30) Foreign Application Priority Data
Jun. 5, 2018 (JP) .............................. JP2018-107877

(51) Int. Cl.
*H02G 3/04* (2006.01)
*B60R 16/02* (2006.01)

(52) U.S. Cl.
CPC ....... *H02G 3/0406* (2013.01); *B60R 16/0215* (2013.01); *H02G 3/0468* (2013.01)

(58) Field of Classification Search
CPC ..... B60R 16/02; H02G 3/0406; H02G 3/0468
(Continued)

(56) References Cited

U.S. PATENT DOCUMENTS

| | | | | |
|---|---|---|---|---|
| 1,668,953 A | * | 5/1928 | Erickson | H02G 3/0487 174/101 |
| 4,801,764 A | * | 1/1989 | Ohlhaber | H01B 7/08 174/117 F |

(Continued)

FOREIGN PATENT DOCUMENTS

| | | |
|---|---|---|
| JP | 2002-300711 A | 10/2002 |
| JP | 2016-25675 A | 2/2016 |
| JP | 2017-131084 A | 7/2017 |

OTHER PUBLICATIONS

Jul. 30, 2019 International Search Report issued in International Patent Application No. PCT/JP2019/019440.

*Primary Examiner* — William H. Mayo, III
*Assistant Examiner* — Krystal Robinson
(74) *Attorney, Agent, or Firm* — Oliff PLC (57) ABSTRACT

A wire harness including: a wire; a flexible outer cover covering the wire; a route regulator that has an axial direction extending along a route where the wire is routed, and that is configured to regulate the route where the wire is routed, from an outside of the outer cover; and a fixing member that is configured to fix the route regulator to the outer cover, wherein the route regulator includes an elastic deformation portion that is elastically deformable.

9 Claims, 8 Drawing Sheets

(58) Field of Classification Search
USPC .................................................... 174/70 c
See application file for complete search history.

(56) References Cited

U.S. PATENT DOCUMENTS

| | | | |
|---|---|---|---|
| 8,563,866 B2 | 10/2013 | Oga et al. | |
| 10,707,666 B2* | 7/2020 | Kawaguchi | H01B 7/0045 |
| 2002/0000499 A1* | 1/2002 | Aoki | B60R 16/0215 248/51 |
| 2012/0298404 A1 | 11/2012 | Tokunaga et al. | |

* cited by examiner

WIRE HARNESS

BACKGROUND

The present disclosure relates to a wire harness.

Conventionally, a wire harness for use in a vehicle, such as a hybrid vehicle or an electric vehicle, is known in which a wire is externally covered with an outer cover member made of resin, such as a corrugated tube or a resin pipe (e.g., see JP 2010-51042M. It is proposed to use a protector in this wire harness at a position where the route needs to be regulated.

SUMMARY

Incidentally, a protector used in the above-described wire harness is, for example, a resin molded article that includes a main body whose upper surface, front surface, and rear surface are open, and a lid for covering the upper surface of the main body. Front and rear opening portions of the main body of the protector serve as the passage of a wire, and a wire route is provided inside the main body and the lid. Thus, if the specification such as the diameter of a wire is changed, a mold for molding a protector needs to be remade, resulting in an increase in costs.

An exemplary aspect of the disclosure provides a wire harness that can easily handle a change in the specification.

A wire harness according to an exemplary aspect includes a wire; a flexible outer cover covering the wire; a route regulator that has an axial direction extending along a route where the wire is routed, and that is configured to regulate the route where the wire is routed, from an outside of the outer cover; and a fixing member that is configured to fix the route regulator to the outer cover, wherein the route regulator includes an elastic deformation portion that is elastically deformable.

According to a wire harness of the present disclosure, it is possible to easily handle a change in the specification.

DETAILED DESCRIPTION OF EMBODIMENTS

First Embodiment

The following describes a first embodiment of a wire harness with reference to the drawings. Note that, in the drawings, some of the components may be exaggerated or simplified for the sake of description. Also, the dimensional ratio of some parts may differ from their actual ratio.

Figure 1:
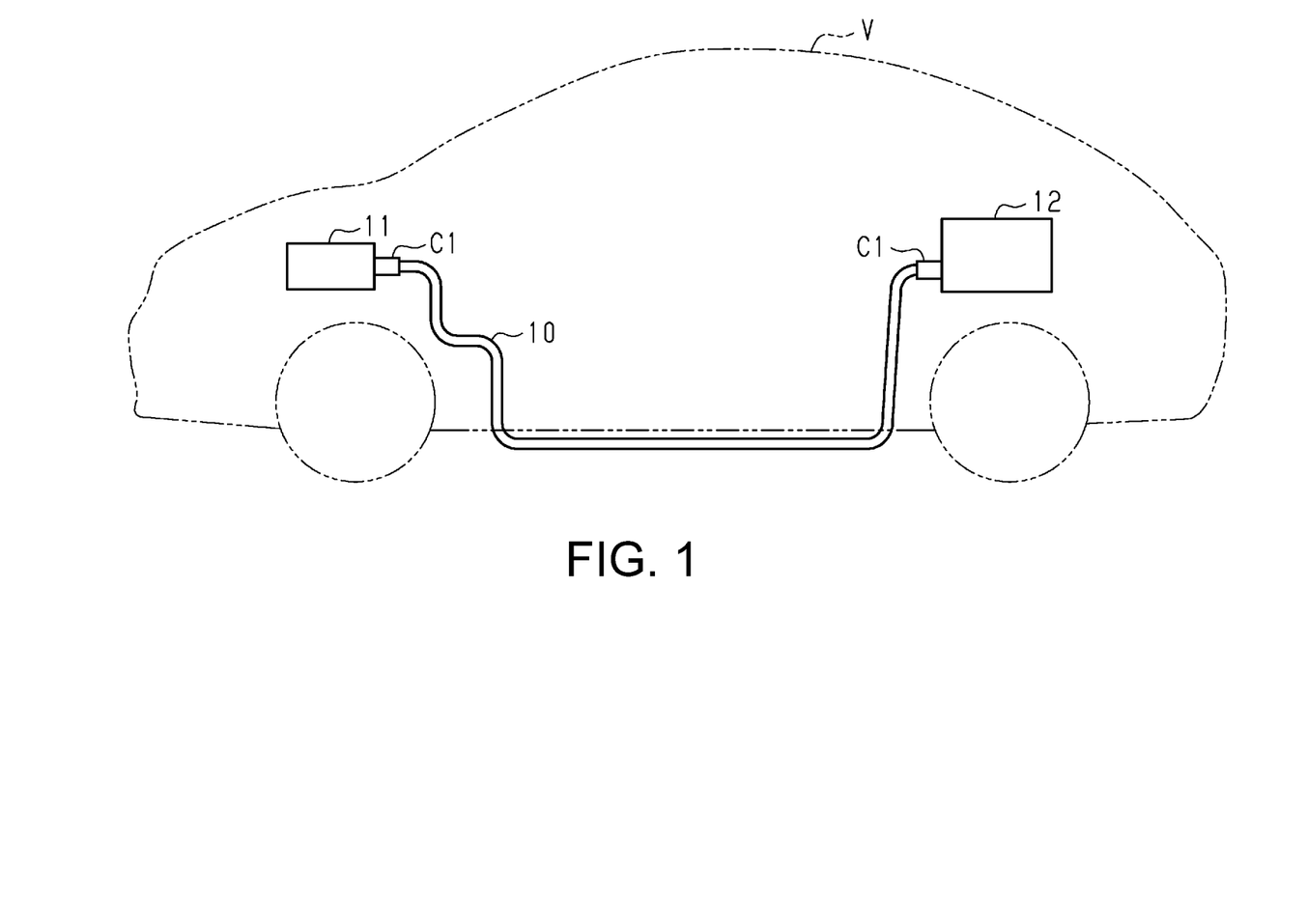
FIG. 1 is a schematic configuration diagram showing a wire harness in a first embodiment.

A wire harness 10 shown in FIG. 1 electrically connects two electric apparatuses (devices), or three or more electric apparatuses (devices). The wire harness 10 electrically connects an inverter 11 disposed in a front part of a vehicle V, such as a hybrid vehicle or an electric vehicle, and a high-voltage battery 12 disposed in a part of the vehicle V rearward of the inverter 11, for example. The wire harness 10 is routed under the floor of the vehicle, for example. The inverter 11 is connected to a wheel driving motor (not shown), which is a power source for driving the vehicle. The inverter 11 generates AC power from DC power that is supplied from the high-voltage battery 12, and supplies the AC power to the motor. The high-voltage battery 12 is a battery that can supply a voltage of several hundred volts, for example.

Figure 2:
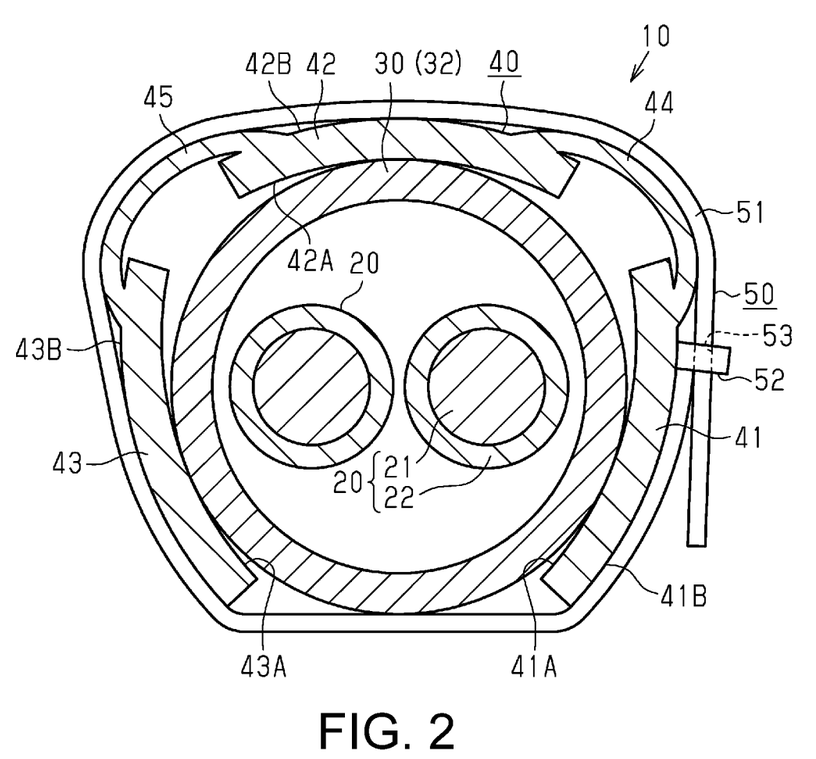
FIG. 2 is a schematic cross-sectional view showing the wire harness in the first embodiment.

As shown in FIGS. 1 and 2, the wire harness 10 includes a plurality (two in this embodiment) of wires 20, a pair of connectors Cl attached to opposite ends of the wires 20, and a flexible outer cover member 30 (flexible outer cover) enclosing the plurality of wires 20 collectively. The wire harness 10 includes a route-regulating member 40 (route regulator) configured to regulate the route where the wires 20 are routed, and a fixing member 50 for fixing the route-regulating member 40 to the outer cover member 30.

The wires 20 are high-voltage wires that can handle high voltages and large currents, for example. The wires 20 are non-shielded wires that have no shielding structure for shielding the wires 20 from electromagnetic waves, for example. One end of the wires 20 is connected to the inverter 11 via one of the connectors C 1, and the other end of the wires 20 is connected to the high-voltage battery 12 via the other connector Cl.

As shown in FIG. 2, the wires 20 are coated wires each including a core wire 21 formed by a conductor and an insulating sheath 22 that covers the outer circumference of the core wire 21. The wires 20 are elongated and extend in the front-back direction of the vehicle, for example. A twisted wire obtained by twisting a plurality of bare metal wires together, a single core wire constituted by one columnar (e.g., cylindrical) metal rod whose inside is solid, or a tubular conductor (a pipe conductor) whose inside is hollow can be used for the core wire 21, for example. A combination of a twisted wire, a single core wire, and/or a tubular conductor may also be used for the core wire 21. A metallic material such as a copper-based material or an aluminum-based material can be used as a material of the core wire 21, for example. The insulating sheath 22 covers the entire outer circumferential surface of the core wire 21 in intimate contact (by areal contact), for example. The insulating sheath 22 is made of an insulating material such as synthetic resin, for example. The insulating sheath 22 can be formed through, for example, extrusion molding (extrusion coating) on the core wire 21.

The outer cover member 30 is flexible, and therefore is deformable along the route where the wires 20 are routed. The outer cover member 30 protects the wires 20 by covering the wires 20. The outer cover member 30 has an overall elongated tubular shape. A plurality of wires 20 are arranged in the space inside of the outer cover member 30. The plurality of wires 20 are arranged side-by-side in a direction intersecting with the direction in which the wires 20 extend, in the space inside of the outer cover member 30.

It is preferable that the outer cover member 30 is made of a resin material from the viewpoint of reducing its weight, for example. It is possible to use synthetic resin such as polyolefin, polyamide, polyester, or an ABS resin, for the resin material, for example. It is possible to use a corrugated tube, a twisted tube, or a hard resin pipe for the outer cover member 30, for example.

Figure 3:
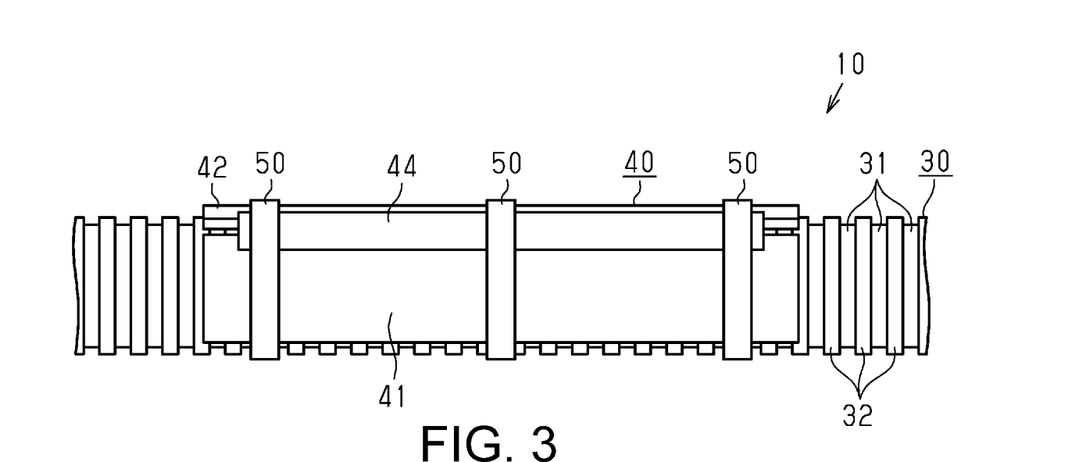
FIG. 3 is a schematic side view showing the wire harness in the first embodiment.
Figure 4:
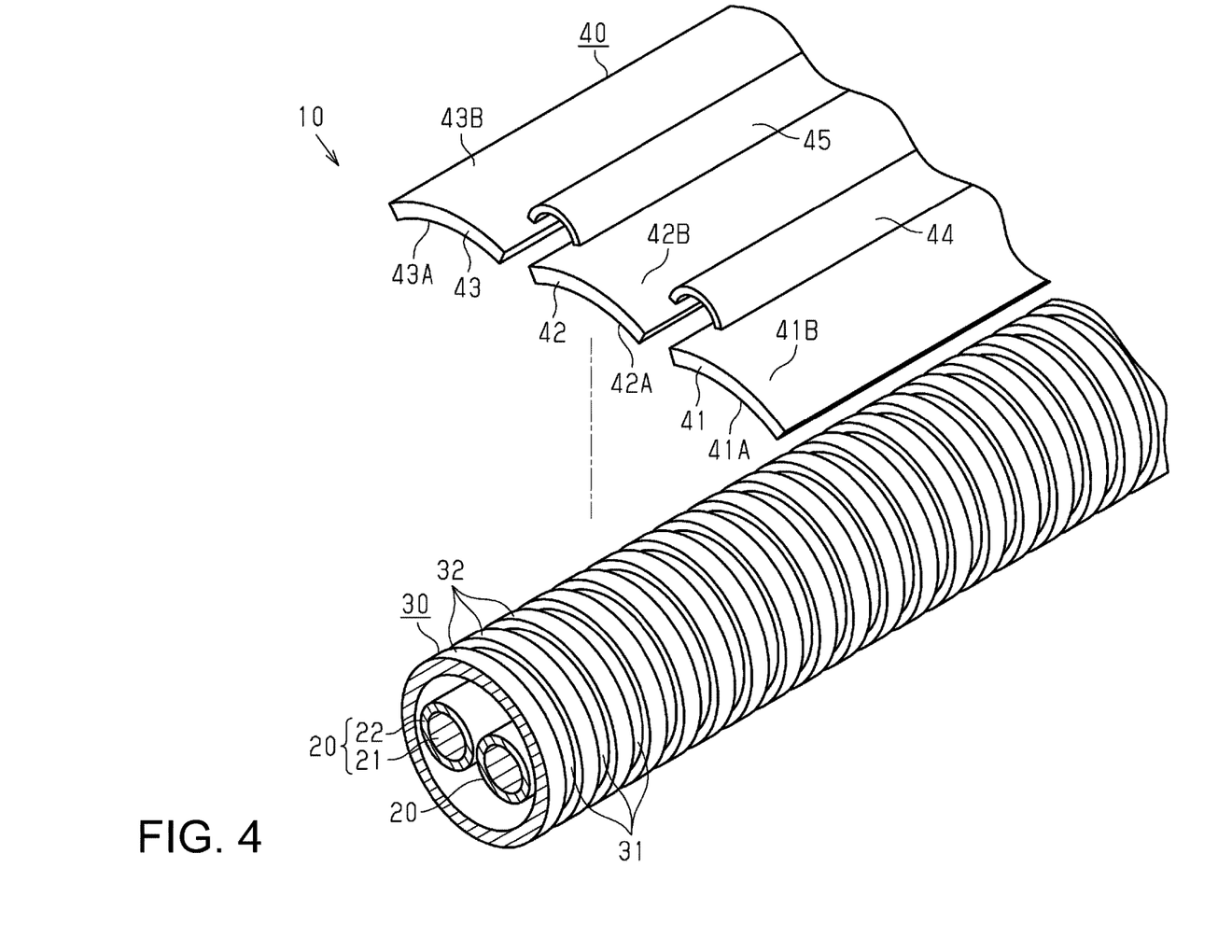
FIG. 4 is a schematic perspective view showing the wire harness in the first embodiment.

As shown in FIGS. 3 and 4, the outer cover member 30 in this example is a flexible corrugated tube that has an accordion structure in which annular recesses 31 and annular protrusions 32 are arranged in an alternating manner in the axial direction (the longitudinal direction). Thus, the outer cover member 30 in this example is elastically deformable in such a manner that its axis is curved or bent. The outer cover member 30 has a substantially tubular shape, for example. As shown in FIG. 4, for example, the annular recesses 31 in the outer cover member 30 have a circular (e.g., perfectly circular) inner circumferential shape and a circular (e.g., perfectly circular) outer circumferential shape. The annular protrusions 32 on the outer cover member 30 have a circular (e.g., perfectly circular) inner circumferential shape and a circular (e.g., perfectly circular) outer circumferential shape.

The outer cover member 30 may also have a cut extending in the axial direction. If the outer cover member 30 has a cut, it is possible to insert the wires 20 into the outer cover member 30 through the cut. Note that, if the outer cover member 30 has a cut, it is possible to inhibit the wires 20 from protruding from the cut by winding a binding member such as adhesive tape around the outer circumference of the outer cover member 30 as needed.

The route-regulating member 40 has an axial direction extending along the route where the wires 20 are routed. The route-regulating member 40 is elongated and extends along the route where the wires 20 are routed. The route-regulating member 40 is arranged so as to partially regulate the route where the wires 20 are routed, from the outside of the outer cover member 30. The route-regulating member 40 is attached to one outer cover member 30. A single route-regulating member 40 or a plurality of route-regulating members 40 may be provided. A plurality of sections of the wire 20 may be regulated by one route-regulating member 40, or one section of the wire 20 may be regulated by a plurality of route-regulating members 40, for example. Moreover, the route-regulating member 40 may be formed by a straight portion only, or may also have a bent portion. The route-regulating member 40 in this example is constituted by a straight portion only, and is arranged so as to partially regulate a straight route out of the routes where the wires 20 are routed, from the outside of the outer cover member 30.

The route-regulating member 40 has a bending rigidity that is higher than the bending rigidity of the outer cover member 30, for example. The route-regulating member 40 bends less than the outer cover member 30. The route-regulating member 40 has a bending rigidity that is higher than the bending rigidity of the wires 20, for example, and thus bends less than the wires 20. The route-regulating member 40 is made of a material that has sufficient rigidity to maintain the shape of the outer cover member 30, for example. The route-regulating member 40 is made of a material that has sufficient rigidity to maintain the route where the wires 20 are routed, the route being located inside the outer cover member 30, for example. A metallic material is favorably used as the material of such a route-regulating member 40, for example. It is possible to use a metallic material such as a copper-based material, an iron-based material, or an aluminum-based material as the metallic material. The route-regulating member 40 can be formed through, for example, extrusion molding.

The route-regulating member 40 in this example includes a plurality (three in this embodiment) plate portions 41, 42, and 43 (plates), a hinge portion 44 (hinge) linking the plate portion 41 and the plate portion 42, and a hinge portion 45 linking the plate portion 42 and the plate portion 43. In the route-regulating member 40 in this example, the three plate portions 41, 42, and 43 and the two hinge portions 44 and 45 are formed as a single body. That is, the route-regulating member 40 in this example is constituted by a single component that has the three plate portions 41, 42, and 43 and the two hinge portions 44 and 45. Note that the plate portions 41, 42, and 43 are linked together via the hinge portions 44 and 45, and are spaced apart from each other.

The plate portions 41, 42, and 43 are flat plate-shaped members that extend in the axial direction extending along the route where the wires 20 are routed, and that also extend in the width direction, which is orthogonal to the axial direction. The plate portions 41, 42, and 43 respectively include inner surfaces 41A, 42A, and 43A that are in contact with the outer cover member 30 when the route-regulating member 40 is fixed to the outer cover member 30, and outer surfaces 41B, 42B, and 43B that are located opposite to the inner surfaces 41A, 42A, and 43A. The plate portions 41, 42, and 43 have a substantially uniform thickness over their entire length in the axial direction and the width direction, for example. The plate portions 41, 42, and 43 are flexible, for example.

The cross sections of the plate portions 41, 42, and 43 in the width direction are curved in an arc shape, for example. That is, the curved shapes of the plate portions 41, 42, and 43 extend along the axial direction of the route-regulating member 40. The plate portions 41, 42, and 43 are curved and protrude outward of the route-regulating member 40 (toward the outer surfaces 41B, 42B, and 43B of the plate portions 41, 42, and 43). The inner surfaces 41A, 42A, and 43A of the plate portions 41, 42, and 43 are formed into curved surfaces that are curved in an arc shape and protrude toward the outer surfaces 41B, 42B, and 43B of the plate portions 41, 42, and 43. Similarly, the outer surfaces 41B, 42B, and 43B of the plate portions 41, 42, and 43 are formed into curved surfaces that are curved in an arc shape and protrude outward of the route-regulating member 40. In this example, because the outer cover member 30 to which the route-regulating member 40 is attached has a circular outer circumferential shape, the inner surfaces 41A, 42A, and 43A of the plate portions 41, 42, and 43 are curved surfaces in conformity with the outer circumferential shape of the outer cover member 30.

The hinge portions 44 and 45 are flat plate-shaped members that extend in the axial direction extending along the route where the wires 20 are routed, and that also extend in the width direction, which is orthogonal to the axial direction. The hinge portions 44 and 45 are configured to be elastically deformable. The hinge portions 44 and 45 are thinner than the plate portions 41, 42, and 43, for example. The hinge portions 44 and 45 have bending rigidity that is lower than that of the plate portions 41, 42, and 43, for example.

The cross sections of the hinge portions 44 and 45 in the width direction are curved in a semicircular shape, for example. That is, the curved shapes of the hinge portions 44 and 45 extend along the axial direction of the route-regulating member 40. The hinge portions 44 and 45 are curved and protrude outward of the route-regulating member 40 (in a direction away from the plate portions 41, 42, and 43).

One end portion of the hinge portion 44 is connected to an end portion of the plate portion 41, and the other end portion of the hinge portion 44 is connected to an end portion of the plate portion 42. One end portion of the hinge portion 44 in the width direction is connected to an end portion of the outer surface 41B of the plate portion 41 located in the width direction, and the other end portion of the hinge portion 44 in the width direction is connected to an end portion of the outer surface 42B of the plate portion 42 located in the width direction, for example. Note that the length of the hinge portion 44 in the axial direction may be smaller than the length of the plate portions 41 and 42 in the axial direction, or may be the same as the length of the plate portions 41 and 42 in the axial direction.

One end portion of the hinge portion 45 is connected to an end portion of the plate portion 42, and the other end portion of the hinge portion 45 is connected to an end portion of the plate portion 43. One end portion of the hinge portion 45 in the width direction is connected to an end portion of the outer surface 42B of the plate portion 42 located in the width direction, and the other end portion of the hinge portion 45 in the width direction is connected to an end portion of the outer surface 43B of the plate portion 43 located in the width direction, for example. Thus, the hinge portion 44 is connected to one end portion of the outer surface 42B of the plate portion 42 in the width direction, and the hinge portion 45 is connected to the other end portion of the outer surface 42B in the width direction. Note that the length of the hinge portion 45 in the axial direction may be smaller than the length of the plate portions 42 and 43 in the axial direction, or may be the same as the length of the plate portions 42 and 43 in the axial direction.

The above-described route-regulating member 40 is configured such that the plate portions 41 and 43 can rotate around the hinge portions 44 and 45 as the centers of rotation due to elastic deformation of the hinge portions 44 and 45. Specifically, the plate portion 41 can rotate respectively around the hinge portion 44 with respect to the plate portion 42. Also, the plate portion 43 can rotate around the hinge portion 45 with respect to the plate portion 42.

Figure 5A:
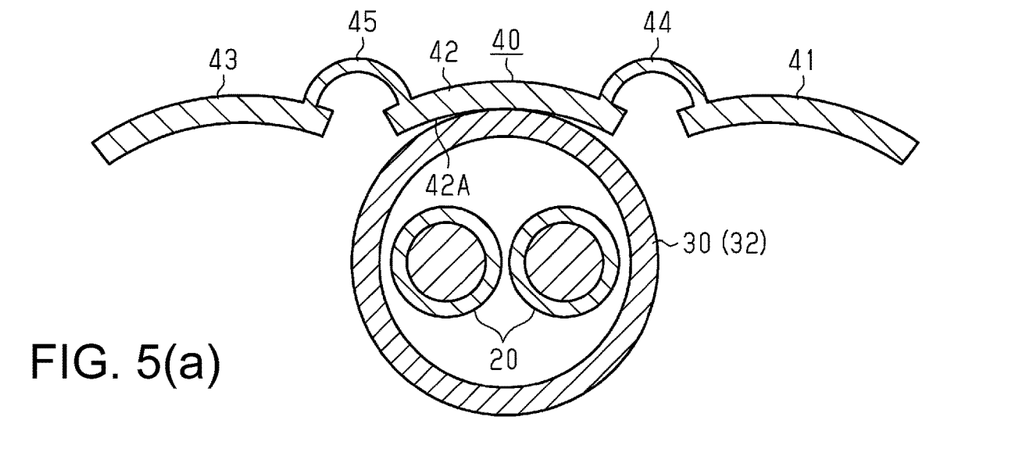
FIGS. 5(a) to 5(c) are schematic cross-sectional views showing a method for manufacturing the wire harness in the first embodiment.
Figure 5B:
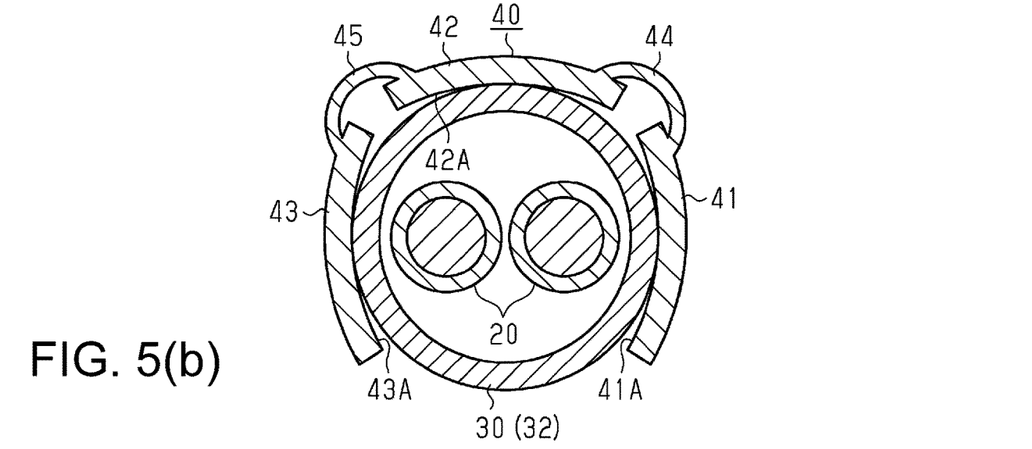
Figure 5C:
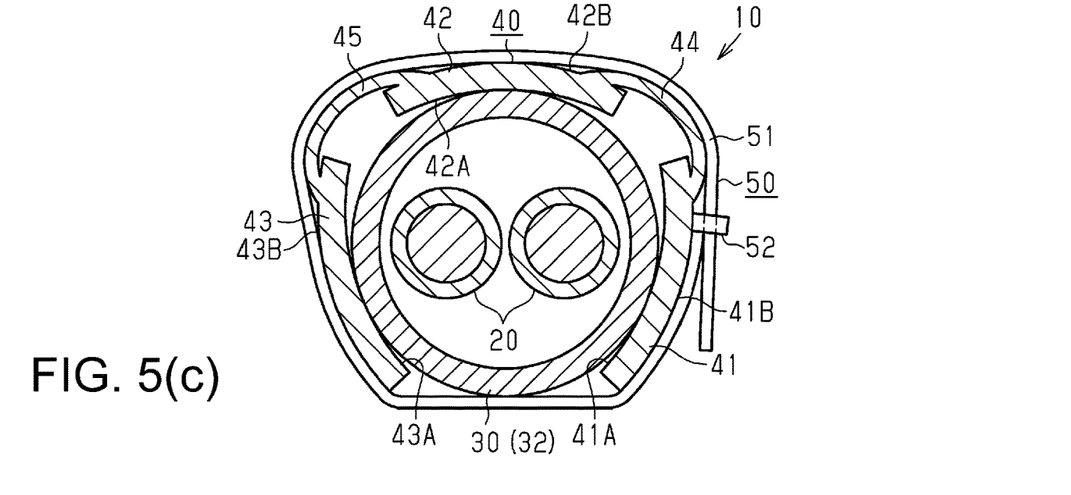

As shown in FIG. 5(*a*), in a natural state in which no external force is applied, the route-regulating member 40 in this example is in a state in which the plate portions 41 and 43 are spaced apart from each other and are spread in the width direction of the route-regulating member 40 (open state). Also, as shown in FIGS. 5(*b*) and 5(*c*), when the plate portions 41 and 43 are rotated respectively around the hinge portions 44 and 45 in a direction in which the plate portions 41 and 43 come close to each other, the route-regulating member 40 reaches a state in which the space surrounded by the plate portions 41, 42, and 43 is reduced (closed state). When the route-regulating member 40 is closed, the route-regulating member 40 is attached to the outer circumference of the outer cover member 30. When the closed route-regulating member 40 is attached to the outer cover member 30, a portion of the outer circumferential surface of the outer cover member 30 is covered by the plurality of plate portions 41, 42, and 43. In other words, the route-regulating member 40 is attached to the outer circumferential surface of the outer cover member 30 such that a portion of the outer circumferential surface of the outer cover member 30 is exposed.

As shown in FIG. 2, the route-regulating member 40 arranged to cover a portion of the outer circumferential surface of the outer cover member 30 is fixed to the outer cover member 30 by the fixing member 50. That is, the fixing member 50 is provided to fix the route-regulating member 40 to the outer cover member 30. Specifically, the fixing member 50 is provided to fix the route-regulating member 40 to the outer cover member 30 in a state in which the fixing member 50 fastens the route-regulating member 40 such that the inner surface of the route-regulating member 40 comes into contact with the outer circumferential surface of the outer cover member 30. The fixing member 50 surrounds the entire outer circumference of the route-regulating member 40 and the outer cover member 30 in the circumferential direction.

The fixing member 50 is a cable tie made of synthetic resin, for example. The fixing member 50 includes a belt-shaped portion 51, and a locking portion 52 formed as a single body with the belt-shaped portion 51 at a base end portion of the belt-shaped portion 51. The locking portion 52 includes an insertion opening 53 into which the belt-shaped portion 51 can be inserted. The inner surface of the insertion opening 53 is provided with a locking claw (not shown). An outer circumferential surface of a leading end portion of the belt-shaped portion 51 is provided with a plurality of locking grooves that extend along the width direction of the belt-shaped portion, the locking grooves being spaced apart from each other at predetermined intervals in the length direction of the belt-shaped portion 51. With the fixing member 50, the belt-shaped portion 51 is locked to the locking portion 52 by engaging the locking claw of the locking portion 52 with one of the plurality of locking grooves formed in the belt-shaped portion 51. With the fixing member 50, it is possible to adjust the degree of fastening of the route-regulating member 40 by the belt-shaped portion 51 in accordance with the degree of insertion of the belt-shaped portion 51 into the locking portion 52

The belt-shaped portion 51 of the fixing member 50 is wound around the entire outer circumference of the route-regulating member 40 and the outer cover member 30 in the circumferential direction in a state in which the leading end portion of the belt-shaped portion 51 is inserted into the insertion opening 53 in the locking portion 52. The belt-shaped portion 51 is wound to establish contact with the outer surface of the route-regulating member 40 and the outer circumferential surface of the outer cover member 30, for example. The fixing member 50 ties up the route-regulating member 40 and the outer cover member 30 by the belt-shaped portion 51 and the locking portion 52 such that the diameter of the route-regulating member 40 is reduced (specifically, the space surrounded by the plate portions 41, 42, and 43 is reduced).

The fixing member 50 fastens the route-regulating member 40 until the inner surfaces 41A, 42A, and 43A of the plate portions 41, 42, and 43 of the route-regulating member 40 come into contact with the outer circumferential surface of the outer cover member 30, for example. At this time, the route-regulating member 40 rotates around the hinge portions 44 and 45 in a direction in which the plate portions 41 and 43 come close to each other due to the fastening effects of the belt-shaped portion 51 of the fixing member 50. In the route-regulating member 40 fixed to the outer cover member 30 by the fixing member 50, a portion of the inner surface 41A of the plate portion 41, a portion of the inner surface 42A of the plate portion 42, and a portion of the inner surface 43A of the plate portion 43 are in contact with the outer circumferential surface of the outer cover member 30. That is, the inner surface of the route-regulating member 40 is not in continuous contact with the outer circumferential surface of the outer cover member 30 in the circumferential direction, but is in intermittent contact with this outer circumferential surface in the circumferential direction.

As shown in FIG. 3, the wire harness 10 in this embodiment is provided with a plurality (three in this embodiment) of fixing members 50 that are spaced apart from each other at predetermined intervals in the axial direction of the route-regulating member 40. A plurality of fixing members 50 are provided at equal intervals in the axial direction of the route-regulating member 40, for example.

Next, one example of a method for manufacturing the wire harness 10 will be described below.

As shown in FIG. 5(a), the outer cover member 30 into which a plurality of wires 20 are inserted, and the route-regulating member 40 are prepared. At this time, the route-regulating member 40 is in a state in which the plate portions 41 and 43 are spaced apart from each other and are spread in the width direction of the route-regulating member 40 (open state), for example. Also, the route-regulating member 40 is arranged to cover the outer circumference of a portion of the outer cover member 30 where the route is to be regulated (e.g., a straight route). Specifically, a portion of the inner surface 42A of the plate portion 42 of the route-regulating member 40 is brought into contact with the outer circumferential surface of the portion of the outer cover member 30 where the route is to be regulated.

Then, as shown in FIG. 5(b), the plate portions 41 and 43 of the route-regulating member 40 are rotated around the hinge portions 44 and 45 in a direction in which the plate portions 41 and 43 come close to each other. Accordingly, the majority of the outer circumferential surface of the outer cover member 30 is enclosed by the route-regulating member 40 (the plate portions 41, 42, and 43).

Then, as shown in FIG. 5(c), the route-regulating member 40 is fastened by the fixing member 50 from the outer side. The plate portions 41 and 43 rotate around the hinge portions 44 and 45 in a direction in which the plate portions 41 and 43 come close to each other due to the fastening effects of the belt-shaped portion 51 of the fixing member 50. Accordingly, the space surrounded by the plate portions 41, 42, and 43 is reduced. Here, the route-regulating member 40 is fastened by the fixing member 50 until the inner surfaces 41A, 42A, and 43A of the plate portions 41, 42, and 43 of the route-regulating member 40 come into contact with the outer circumferential surface of the outer cover member 30. Accordingly, it is possible to fix the route-regulating member 40 to the outer cover member 30 in a state in which portions of the inner surfaces 41A, 42A, and 43A of the plate portions 41, 42, and 43 are in contact with the outer circumferential surface of the outer cover member 30.

As described above, the wire harness 10 can be obtained by fixing the route-regulating member 40 to the outer cover member 30. Note that the wires 20 may be arranged in the outer cover member 30 before or after the route-regulating member 40 is attached to the outer cover member 30.

Next, effects of this embodiment will be described below.

The route-regulating member 40 includes the hinge portions 44 and 45, which are elastically deformable. The above-described route-regulating member 40 is configured such that the plate portions 41 and 43 can rotate around the hinge portions 44 and 45 as the centers of rotation. Thus, by adjusting the amount of rotation of the plate portions 41 and 43 with respect to the plate portion 42, it is possible to change the size of the space surrounded by the plate portions 41, 42, and 43, that is, an accommodation space in which the outer cover member 30 is accommodated. Therefore, the route-regulating member 40 can change the size of the accommodation space in which the outer cover member 30 is accommodated, according to the diameter (the outer shape) of the outer cover member 30. In other words, it is possible to attach one type of route-regulating member 40 to a plurality of types of outer cover members 30 having different diameters (outer shapes).

Figure 6:
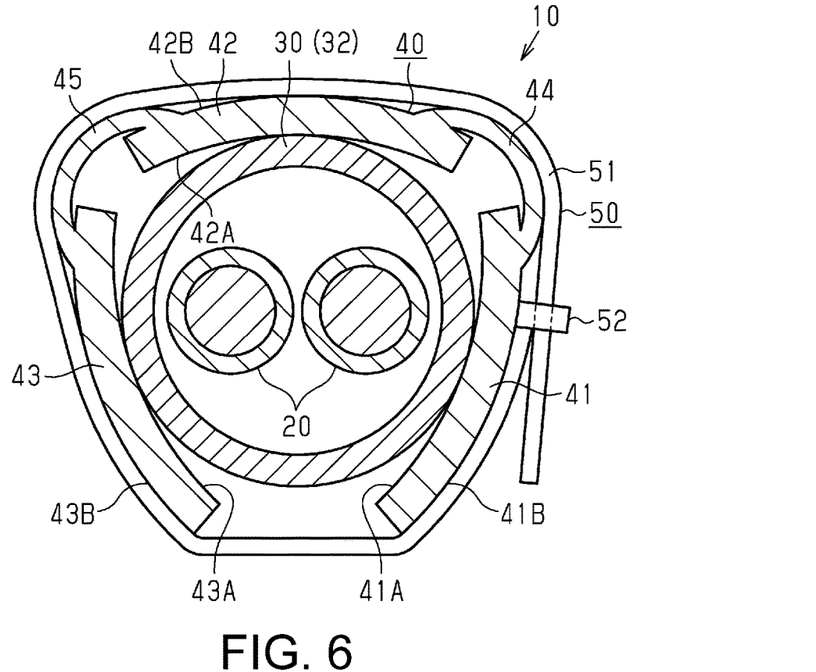
FIG. 6 is a schematic cross-sectional view showing effects of the wire harness in the first embodiment.

As shown in FIG. 6, if the diameter of the outer cover member 30 is smaller than the diameter of the outer cover member 30 shown in FIG. 2, for example, the plate portions 41 and 43 are rotated around the hinge portions 44 and 45 such that the plate portions 41 and 43 come closer to each other than in the state shown in FIG. 2. Accordingly, the space surrounded by the plate portions 41, 42, and 43 is reduced. In this case, in the route-regulating member 40 fixed to the outer cover member 30 by the fixing member 50, a portion of the inner surface 41A of the plate portion 41, a portion of the inner surface 42A of the plate portion 42, and a portion of the inner surface 43A of the plate portion 43 are also in contact with the outer circumferential surface of the outer cover member 30. That is, even if the diameter of the outer cover member 30 is changed, the inner surface of the route-regulating member 40 is in intermittent contact with the outer circumferential surface of the outer cover member 30 in the circumferential direction. Note that, the smaller the outer shape of the outer cover member 30 is, the smaller the area of the outer circumferential surface of the outer cover member 30 that is exposed from the route-regulating member 40 is.

Next, effects of this embodiment will be described below.

(1-1) The route-regulating member 40 includes the hinge portions 44 and 45, which are elastically deformable. The route-regulating member 40 is configured such that the plate portions 41 and 43 can rotate around the hinge portions 44 and 45 as the centers of rotation. That is, it is possible to change the relative positions of the plate portions 41, 42, and 43 through the elastic deformation of the hinge portions 44 and 45 in the route-regulating member 40. Thus, by adjusting the amount of rotation of the plate portions 41 and 43 with respect to the plate portion 42 (the relative positions of the plate portions 41, 42, and 43), it is possible to change the size of the space surrounded by the plate portions 41, 42, and 43, that is, an accommodation space in which the outer cover member 30 is accommodated. Therefore, the route-regulating member 40 can change the size of the accommodation space in which the outer cover member 30 is accommodated, according to the diameter (the outer shape) of the outer cover member 30. In other words, it is possible to attach one type of route-regulating member 40 to a plurality of types of outer cover members 30 having outer shapes with different sizes. Thus, even if the diameter of the outer cover member 30 is changed following a change in the diameter of the wires 20 or the like, it is possible to handle a change in the specification, using one type of route-regulating member 40.

(1-2) The route where the wires 20 are routed is regulated, from the outside of the outer cover member 30, by the route-regulating member 40 that has a bending rigidity that is higher than the bending rigidity of the outer cover member 30. Because the route-regulating member 40 functions as a splint member, it is possible to keep the flexible outer cover member 30 in a desired shape extending along the route where the wires 20 are routed.

As in this embodiment, if the outer cover member 30 is a flexible corrugated tube, for example, a straight route is likely to warp, and it is difficult to maintain a straight shape. In contrast, with the wire harness 10 in this embodiment, deformations such as warping of the outer cover member 30 are regulated by the route-regulating member 40 because the route-regulating member 40, which is a splint member, is fixed to the outer circumference of the outer cover member 30. Accordingly, it is possible to keep the flexible outer cover member 30 in a desired shape extending along the route where the wires 20 are routed.

(1-3) The route-regulating member 40 is constituted by the three plate portions 41, 42, and 43 and the two hinge portions 44 and 45 linking the plate portions 41, 42, and 43. Accordingly, it is possible to favorably bring the inner surfaces 41A, 42A, and 43A of the three plate portions 41, 42, and 43 into contact with the outer circumferential surface of the outer cover member 30. Therefore, the outer cover member 30 can be three-dimensionally held by the route-regulating member 40, and thus the outer cover member 30 can be stably held by the route-regulating member 40.

(1-4) The inner surfaces 41A, 42A, and 43A of the plurality of plate portions 41, 42, and 43 are curved surfaces in conformity with the outer circumferential shape of the outer cover member 30 having a circular outer circumferential shape. Thus, when the route-regulating member 40 is fixed to the outer circumferential surface of the outer cover member 30, it is possible to increase the area of contact between the outer circumferential surface of the outer cover member 30 and the inner surfaces 41A, 42A, and 43A of the plate portions 41, 42, and 43. Therefore, the outer cover member 30 can be stably held by the route-regulating member 40.

Second Embodiment

Next, a second embodiment of a wire harness will be described with reference to the drawings. In the drawings, some of the components may be exaggerated or simplified for the sake of description. Also, the dimensional ratio of some parts may differ from their actual ratio. Note that differences between the first embodiment and this embodiment will be mainly described, and configurations that are similar to those of the first embodiment are given the same reference numerals, and some or all of their descriptions may be omitted.

Figure 7:
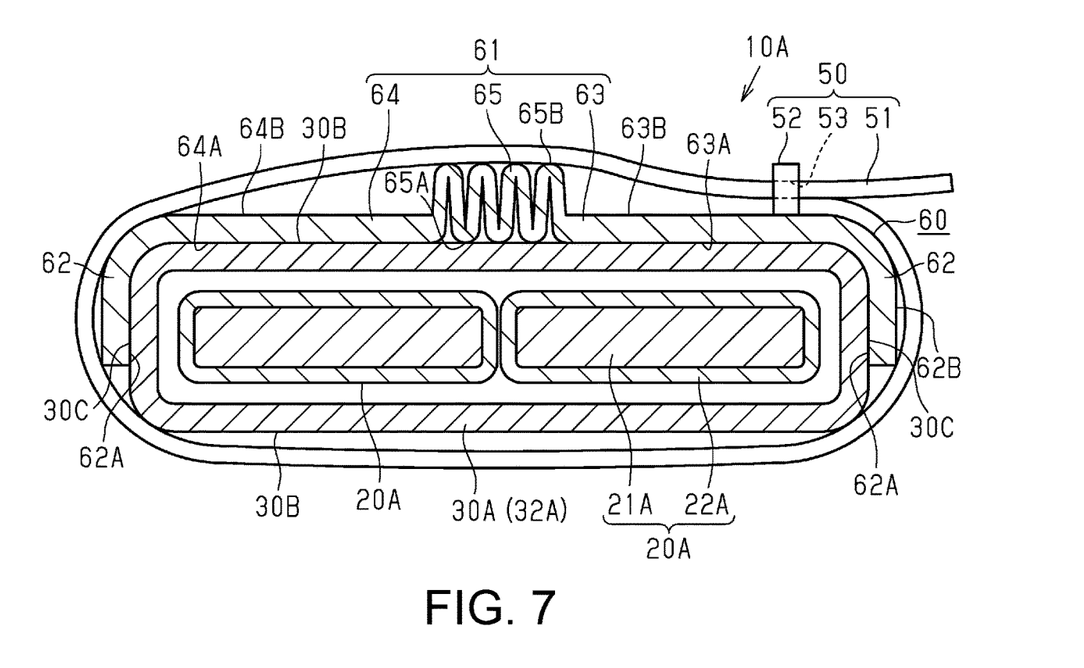
FIG. 7 is a schematic cross-sectional view showing a wire harness in a second embodiment.

As shown in FIG. 7, a wire harness 10A includes a plurality (two in this embodiment) of wires 20A, a flexible outer cover member 30A that collectively encloses the plurality of wires 20A, a route-regulating member 60 for regulating the route where the wires 20A are routed, and a fixing member 50 for fixing the route-regulating member 60 to the outer cover member 30A.

The wires 20A are high-voltage wires that can handle high voltages and large currents, for example. Also, the wires 20A are non-shielded wires that have no shielding structure for shielding the wires 20A from electromagnetic waves, for example.

The wires 20A are coated wires each including a core wire 21A formed by a conductor and an insulating sheath 22A that covers the outer circumference of the core wire 21A. The wires 20A are elongated and extend in the front-back direction of the vehicle, for example. A cross-sectional shape of the core wire 21A that is perpendicular to the axial direction (that is, a cross-sectional shape obtained by cutting the core wire 21A along a plane orthogonal to the axial direction of the core wire 21A) is a flat shape, for example. In this specification, a "flat shape" includes rectangular (excluding square), oval, and elliptical shapes, for example. Also, a "rectangular shape" includes shapes obtained by chamfering a ridge portion and shapes obtained by rounding a ridge portion. The cross-sectional shape of the core wire 21A that is perpendicular to the axial direction in this example is a rectangular shape (specifically, a rectangular shape with rounded ridge portions). A twisted wire, a single core wire, or a tubular conductor, or a combination of these may also be used for the core wire 21A, for example. A metallic material such as a copper-based material or an aluminum-based material can be used as a material of the core wire 21A, for example. The insulating sheath 22A covers the entire outer circumferential surface of the core wire 21A in intimate contact, for example. Thus, the insulating sheath 22A has a flat tubular shape. The insulating sheath 22A is made of an insulating material such as synthetic resin, for example. The insulating sheath 22A can be formed through, for example, extrusion molding (extrusion coating) on the core wire 21A.

The outer cover member 30A is flexible, and therefore is deformable along the route where the wires 20A are routed. The outer cover member 30A protects the wires 20A by covering the wires 20A. The outer cover member 30A has an overall elongated tubular shape. The plurality of wires 20A are arranged in the space inside of the outer cover member 30A. The plurality of wires 20A are arranged side-by-side in a direction intersecting with the direction in which the wires 20A extend, in the space inside of the external member 30A. The plurality of wires 20A are arranged side-by-side such that short sides of its rectangular shape face each other in the space inside of the external member 30A.

It is preferable that the outer cover member 30A is made of a resin material from the viewpoint of reducing its weight, for example. It is possible to use synthetic resin such as polyolefin, polyamide, polyester, or an ABS resin, for the resin material, for example. It is possible to use a corrugated tube, a twisted tube, or a hard resin pipe for the outer cover member 30A, for example.

Figure 8:
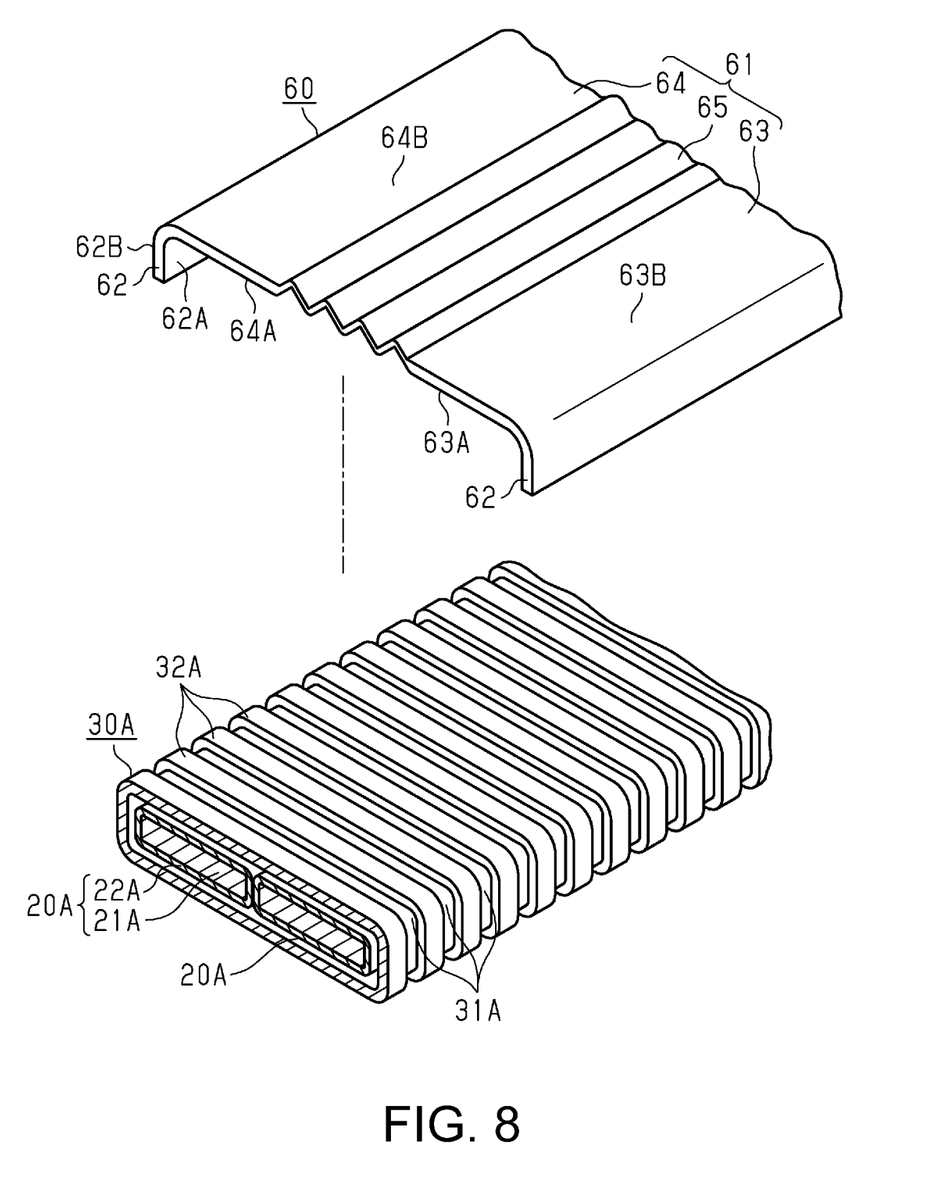
FIG. 8 is a schematic perspective view showing the wire harness in the second embodiment.

As shown in FIG. 8, the outer cover member 30A in this example is a flexible corrugated tube that has an accordion structure in which annular recesses 31A and annular protrusions 32A are arranged in an alternating manner in the axial direction (the longitudinal direction). A cross-sectional shape of the outer cover member 30A that is perpendicular to the axial direction is a flat shape, for example. The annular recesses 31A in the outer cover member 30A have a flat inner circumferential shape and a flat outer circumferential shape (here, a rectangular shape with rounded ridge portions). The annular protrusions 32A on the outer cover member 30A have a flat inner circumferential shape and a flat outer circumferential shape (a rectangular shape with rounded ridge portions in this embodiment). In this manner, the outer cover member 30A in this example is a flat tubular corrugated tube. Note that the outer cover member 30A may also have a cut extending in the axial direction.

The route-regulating member 60 has an axial direction extending along the route where the wires 20A are routed. The route-regulating member 60 is elongated and extends along the route where the wires 20A are routed. The route-regulating member 60 is arranged so as to partially regulate the route where the wires 20A are routed, from the outside of the outer cover member 30A. The route-regulating member 60 is attached to one outer cover member 30A. A single route-regulating member 60 or a plurality of route-regulating members 60 may be provided. Also, the route-regulating member 60 may be constituted by a straight portion only, or may also have a bent portion. The route-regulating member 60 in this example is constituted by a straight portion only, and is provided so as to partially regulate a straight route out of the routes where the wires 20A are routed, from the outside of the outer cover member 30A.

The route-regulating member 60 has a bending rigidity that is higher than the bending rigidity of the outer cover member 30A, for example. The route-regulating member 60 bends less than the outer cover member 30A. A metallic material such as a copper-based material, an iron-based material, or an aluminum-based material can be used as a material of the route-regulating member 60, for example. The route-regulating member 60 can be formed through, for example, extrusion molding.

The route-regulating member 60 in this example includes a main body portion 61 that extends in the axial direction extending along the route where the wires 20A are routed and that extends in the width direction orthogonal to the axial direction, and a pair of side wall portions 62 (side walls) formed at two end portions of the main body portion 61 in the width direction. The main body portion 61 includes a plurality (two in this embodiment) plate portions 63 and 64, and an elastic deformation portion 65 provided between the plurality of plate portions 63 and 64. In the route-regulating member 60 in this example, the main body portion 61 (the plurality of plate portions 63 and 64 and the elastic deformation portion 65) and the side wall portions 62 are formed as a single body. That is, the route-regulating member 60 in this example is constituted by a single component that has the plurality of plate portions 63 and 64, the elastic deformation portion 65, and the side wall portions 62.

The plate portions 63 and 64 are flat plate-shaped members that extend in the axial direction extending along the route where the wires 20A are routed, and that also extend in the width direction. The plate portions 63 and 64 respectively include inner surfaces 63A and 64A that are in contact with the outer cover member 30A when the route-regulating member 60 is fixed to the outer cover member 30A, and outer surfaces 63B and 64B that are located opposite to the inner surfaces 63A and 64A. The plate portions 63 and 64 have a substantially uniform thickness over their entire lengths in the axial direction and the width direction, for example.

As shown in FIG. 7, the inner surfaces 63A and 64A of the plate portions 63 and 64 are flat surfaces, for example. The outer surfaces 63B and 64B of the plate portions 63 and 64 are flat surfaces, for example. Here, the inner surfaces 63A and 64A of the plate portions 63 and 64 come into contact with an outer circumferential surface 30B out of the outer circumferential surfaces of the outer cover member 30A that constitutes long sides of its rectangular shape when the route-regulating member 60 is fixed to the outer cover member 30A. At this time, the outer circumferential surfaces 30B of the outer cover member 30A are flat surfaces. Thus, in this example, the inner surfaces 63A and 64A of the plate portions 63 and 64 are flat surfaces in conformity with the shape of the outer circumferential surface 30B of the outer cover member 30A. The inner surface 63A of the plate portion 63 and the inner surface 64A of the plate portion 64 are formed on the same plane, for example. The outer surface 63B of the plate portion 63 and the outer surface 64B of the plate portion 64 are formed on the same plane, for example.

The pair of side wall portions 62 respectively extend vertically from the inner surfaces 63A and 64A of the plate portions 63 and 64. The pair of side wall portions 62 extend downward in the drawing (specifically, in a direction orthogonal to the width direction, away from the outer surfaces 63B and 64B of the plate portions 63 and 64) from the two end portions of the inner surface of the main body portion 61 located in the width direction, and extend substantially perpendicularly to these two end portions, for example. Specifically, one side wall portion 62 extends vertically from an end portion of the inner surface 63A of the plate portion 63 located in the width direction, and the other side wall portion 62 extends vertically from an end portion of the inner surface 64A of the plate portion 64 located in the width direction. The side wall portions 62 each include the inner surface 62A and the outer surface 62B that is located opposite to this inner surface 62A.

The inner surfaces 62A of the side wall portions 62 are flat surfaces, for example. The outer surfaces 62B of the plate portions 62 are flat surfaces, for example. Here, the inner surfaces 62A of the side wall portions 62 come into contact with outer circumferential surfaces 30C out of the outer circumferential surfaces of the outer cover member 30A that constitute short sides of its rectangular shape when the route-regulating member 60 is fixed to the outer cover member 30A. At this time, the outer circumferential surfaces 30C of the outer cover member 30A are flat surfaces. Thus, in this example, the inner surfaces 62A of the side wall portions 62 are flat surfaces in conformity with the shape of the outer circumferential surfaces 30C of the outer cover member 30A.

In this embodiment, the ridge portions of the route-regulating member 60 (specifically, portions where the plate portions 63 and 64 are connected to the side wall portions 62) are rounded. Thus, portions where the inner surfaces 63A and 64A of the plate portions 63 and 64 are connected to the inner surfaces 62A of the side wall portions 62 are formed into curved surfaces that are curved in an arc shape. Similarly, portions where the outer surfaces 63B and 64B of the plate portions 63 and 64 are connected to the outer surfaces 62B of the side wall portions 62 are formed into curved surfaces that are curved in an arc shape.

The elastic deformation portion 65 is elastically deformable. The elastic deformation portion 65 is thinner than the plate portions 63 and 64, for example. The elastic deformation portion 65 has a bending rigidity that is lower than that of the plate portions 63 and 64, for example.

The elastic deformation portion 65 is formed at a middle portion (a substantially central portion in this embodiment) of the main body portion 61 located in the width direction. The elastic deformation portion 65 in this example has an accordion structure in which crest portions (crests) and trough portions (troughs) are formed in an alternating manner between the plate portion 63 and the plate portion 64. The elastic deformation portion 65 is stretchable due to the elastic deformation portion 65 having an accordion structure. It is possible to change the length of the route-regulating member 60 (specifically, the main body portion 61) in the width direction by changing the degree of extension of the elastic deformation portion 65.

It is preferable that, with the elastic deformation portion 65, an inner surface 65A of the trough portions is formed on the same plane as the inner surfaces 63A and 64A of the plate portions 63 and 64, or on the outer surfaces 63B and 64B side of the plate portions 63 and 64 with respect to the inner surfaces 63A and 64A. In other words, it is preferable that the inner surface 65A of the elastic deformation portion 65 does not protrude from the inner surfaces 63A and 64A of the plate portions 63 and 64 toward the outer cover member 30A. The inner surface 65A of the elastic deformation portion 65 in this example are formed on the same plane as the inner surfaces 63A and 64A of the plate portions 63 and 64. With the elastic deformation portion 65, an outer surface 65B of the crest portions protrudes outward of the route-regulating member 60 from the outer surfaces 63B and 64B of the plate portions 63 and 64.

The route-regulating member 60 described above is attached to the outer cover member 30A to cover portions of the outer circumferential surface of the outer cover member 30A. In other words, the route-regulating member 60 is attached to the outer circumferential surface of the outer cover member 30A such that portions of the outer circumferential surfaces of the outer cover member 30A (one of the two outer circumferential surfaces 30B and portions of the outer circumferential surfaces 30C in this embodiment) are exposed.

The route-regulating member 60 arranged to cover portions of the outer circumferential surface of the outer cover member 30A is fixed to the outer cover member 30A by the fixing member 50. That is, the fixing member 50 is provided to fix the route-regulating member 60 to the outer cover member 30A. Specifically, the fixing member 50 is provided to fix the route-regulating member 60 to the outer cover member 30A in a state in which the fixing member 50 fastens the route-regulating member 60 such that the inner surface of the route-regulating member 60 comes into contact with the outer circumferential surface of the outer cover member 30A. The fixing member 50 surrounds the entire outer circumference of the route-regulating member 60 and the outer cover member 30A in the circumferential direction.

The belt-shaped portion 51 of the fixing member 50 is wound around the entire outer circumference of the route-regulating member 60 and the outer cover member 30A in the circumferential direction in a state in which the leading end portion of the belt-shaped portion 51 is inserted into the insertion opening 53 in the locking portion 52. The belt-shaped portion 51 is wound to establish contact with the outer surface of the route-regulating member 60 and the outer circumferential surface of the outer cover member 30A, for example. The fixing member 50 ties up the route-regulating member 60 and the outer cover member 30A by the belt-shaped portion 51 and the locking portion 52 such that the diameter of the route-regulating member 60 is reduced (specifically, the space surrounded by the main body portion 61 and the side wall portions 62 is reduced) by shrinking the elastic deformation portion 65 of the route-regulating member 60. The fixing member 50 fastens the route-regulating member 60 until the inner surfaces 62A of the side wall portions 62 of the route-regulating members 60 come into contact with the outer circumferential surfaces 30C of the outer cover member 30A, for example. With the route-regulating member 60 fixed to the outer cover member 30A by the fixing member 50, the inner surfaces 63A and 64A of the plate portions 63 and 64 are in contact with the outer circumferential surface 30B of the outer cover member 30A, and the inner surfaces 62A of the side wall portions 62 are in contact with the outer circumferential surfaces 30C of the outer cover member 30A.

Next, one example of a method for manufacturing the wire harness 10A will be described below with reference to FIGS. 9 and 10.

Figure 9A:
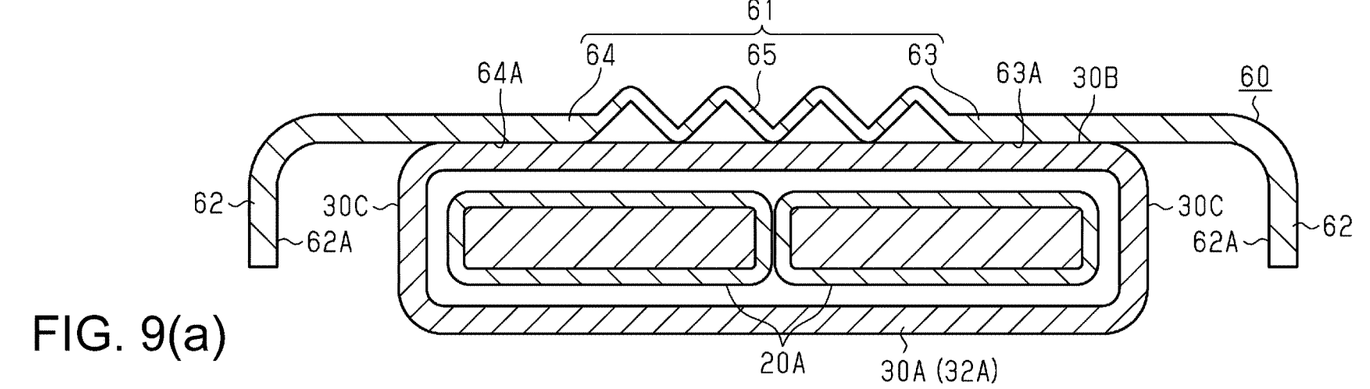
FIGS. 9(a) and 9(b) are schematic cross-sectional views showing a method for manufacturing the wire harness in the second embodiment.

As shown in FIG. 9(a), the outer cover member 30A into which a plurality of wires 20A are inserted, and the route-regulating member 60 are prepared. At this time, the elastic deformation portion 65 of the route-regulating member 60 is stretched out (that is, is spread in the width direction). Also, the route-regulating member 60 is arranged to cover the outer circumference of a portion of the outer cover member 30A where the route is to be regulated (e.g., a straight route). Specifically, the inner surfaces 63A and 64A of the plate portions 63 and 64 of the route-regulating member 60 are brought into contact with the outer circumferential surface 30B of the portion of the outer cover member 30A where the route is to be regulated. At this time, the length of the route-regulating member 60 in the width direction is longer than the length of the outer circumferential surface 30B of the outer cover member 30A in the width direction.

Figure 9B:
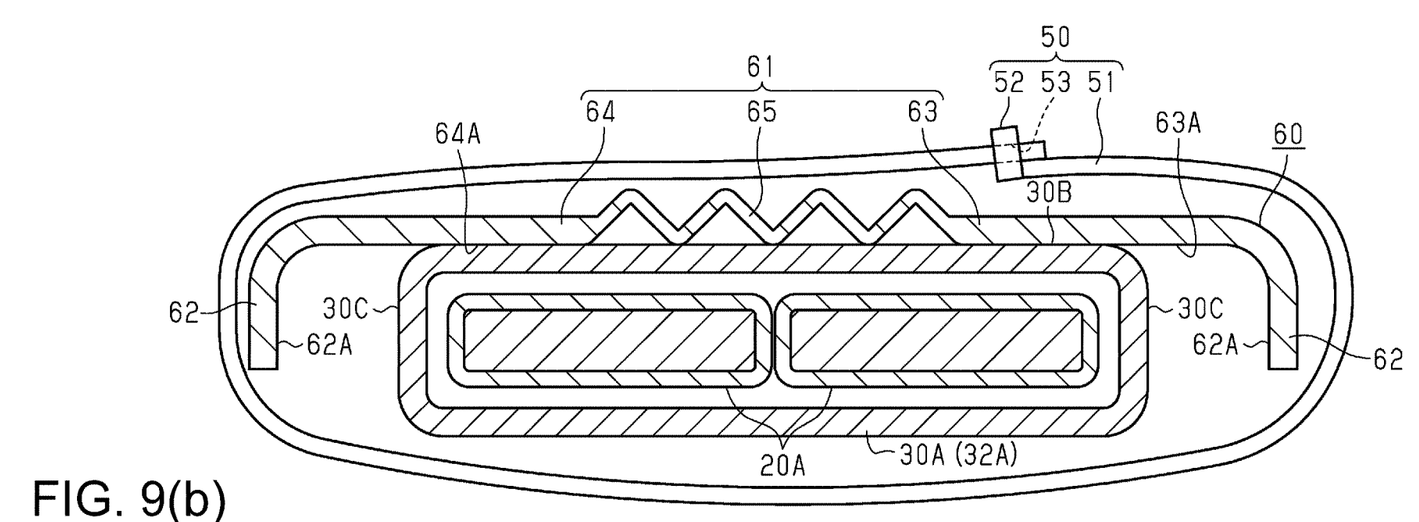

Then, as shown in FIG. 9(b), the fixing member 50 is arranged to surround the route-regulating member 60 and the outer cover member 30A from the outer side.

Figure 10:
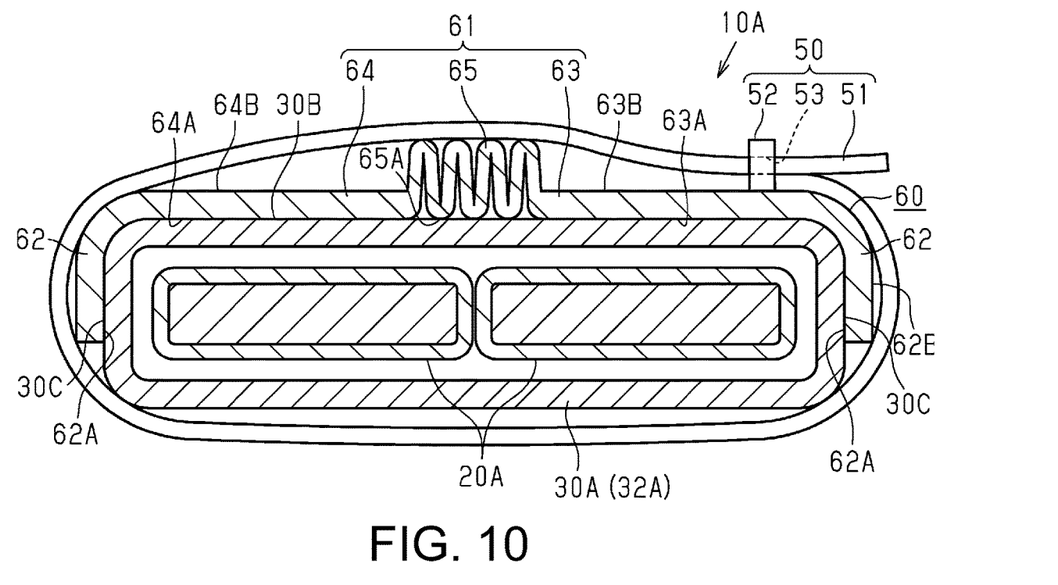
FIG. 10 is a schematic cross-sectional view showing a method for manufacturing the wire harness in the second embodiment.

Then, as shown in FIG. 10, the route-regulating member 60 is fastened by the fixing member 50 from the outer side. The elastic deformation portion 65 of the route-regulating member 60 deforms to shrink due to the fastening effects of the belt-shaped portion 51 of the fixing member 50. Accordingly, the length of the route-regulating member 60 (the main body portion 61) in the width direction is shortened. Here, when the route-regulating member 60 is fastened by the fixing member 50 from the outer side, the elastic deformation portion 65 is shrunk until the inner surfaces 62A of the side wall portions 62 of the route-regulating member 60 come into contact with the outer circumferential surfaces 30C of the outer cover member 30A. Accordingly, it is possible to fix the route-regulating member 60 to the outer cover member 30A in a state in which the inner surfaces 62A, 63A, and 64A of the route-regulating member 60 are in contact with the outer circumferential surfaces 30B and 30C of the outer cover member 30A.

As described above, the wire harness 10A can be obtained by fixing the route-regulating member 60 to the outer cover member 30A. Note that the wires 20A may be arranged in the outer cover member 30A before or after the route-regulating member 60 is attached to the outer cover member 30A.

Next, effects of this embodiment will be described below.

(2-1) The route-regulating member 60 includes the elastic deformation portion 65 that have an accordion structure and are elastically deformable. It is possible to change the length of the main body portion 61 in the width direction by stretching or shrinking the elastic deformation portion 65 in the route-regulating member 60. Thus, by adjusting the degree of extension of the elastic deformation portion 65, it is possible to change the size of the space surrounded by the main body portion 61 and the side wall portions 62, that is, the size of the accommodation space in which the outer cover member 30A is accommodated. Therefore, the route-regulating member 60 can change the size of the accommodation space in which the outer cover member 30A is accommodated, according to the size of the outer shape of the outer cover member 30A. In other words, it is possible to attach one type of route-regulating member 60 to a plurality of types of outer cover members 30A having outer shapes with different sizes. Thus, even if the size of the outer shape of the outer cover member 30A is changed following a change in the diameter of the wires 20A or the like, it is possible to handle a change in the specification, using one type of route-regulating member 60.

(2-2) The route where the wires 20A are routed is regulated, from the outside of the outer cover member 30A, by the route-regulating member 60 that has a bending rigidity that is higher than the bending rigidity of the outer cover member 30A. Because the route-regulating member 60 functions as a splint member, it is possible to keep the flexible outer cover member 30A in a desired shape extending along the route where the wires 20A are routed.

(2-3) The inner surfaces 63A and 64A of the plurality of plate portions 63 and 64 are flat surfaces in conformity with the shape of the outer circumferential shape 30B of the outer cover member 30A. Thus, when the route-regulating member 60 is fixed to the outer circumferential surface of the outer cover member 30A, it is possible to increase the area of contact between the outer circumferential surface 30B of the outer cover member 30A and the inner surfaces 63A and 64A of the plate portions 63 and 64. Therefore, the outer cover member 30A can be stably held by the route-regulating member 60.

(2-4) The inner surfaces 62A of the pair of side wall portions 62 are flat surfaces in conformity with the shape of the outer circumferential surfaces 30C of the outer cover member 30A. Thus, when the route-regulating member 60 is fixed to the outer circumferential surface of the outer cover member 30A, it is possible to increase the area of contact between the outer circumferential surfaces 30C of the outer cover member 30A and the inner surfaces 62A of the side wall portions 62. Therefore, the outer cover member 30A can be stably held by the route-regulating member 60.

(2-5) The inner surface 65A of the elastic deformation portion 65 is formed on the same plane as the inner surfaces 63A and 64A of the plate portions 63 and 64. In other words, the inner surface 65A of the elastic deformation portion 65 do not protrude from the inner surfaces 63A and 64A of the plate portions 63 and 64 toward the outer cover member 30A. Thus, it is possible to prevent the contact between the inner surfaces 63A and 64A of the plate portions 63 and 64 and the outer circumferential surface 30B of the outer cover member 30A from being inhibited by the elastic deformation portion 65. Accordingly, it is possible to favorably bring the inner surfaces 63A and 64A of the plate portions 63 and 64 into contact with the outer circumferential surface 30B of the outer cover member 30A. Therefore, the outer cover member 30A can be stably held by the route-regulating member 60.

(2-6) The pair of side wall portions 62 extend vertically from two end portions of the inner surface of the main body portion 61 located in the width direction and extend substantially perpendicularly to the two end portions. Accordingly, it is possible to increase the rigidity of the side wall portions 62, and thus to favorably inhibit the deformation of the side wall portions 62 when fastened by the fixing member 50.

Other Embodiments

The embodiments described above can be modified as follows. The embodiments described above and following modifications may be combined to the extent that they do not contradict to each other technically.

There is no particular limitation to the structure of the route-regulating member 40 in the above-described first embodiment.

Although the hinge portions 44 and 45 are connected to the outer surfaces 41B, 42B, and 43B of the plate portions 41, 42, and 43 in the above-described first embodiment, for example, a configuration may also be adopted in which the hinge portions 44 and 45 are connected to end surfaces of the plate portions 41, 42, and 43 in the width direction.

The route-regulating member 40 may also be constituted by two plate portions and one hinge portion linking these two plate portions. Alternatively, the route-regulating member 40 may also be constituted by four or more plate portions and three or more hinge portions linking these plate portions.

Although elastic deformation portions are used as the hinge portions 44 and 45 in the above-described first embodiment, the elastic deformation portion is not limited to this, and the hinge portions 44 and 45 may also be changed to have another elastically deformable structure (e.g., an accordion structure).

Although the inner surfaces 41A, 42A, and 43A of the plate portions 41, 42, and 43 are curved surfaces in conformity with the shape of the outer circumferential surface of the outer cover member 30 in the above-described first embodiment, there is no limitation thereto. The inner surfaces 41A, 42A, and 43A of the plate portions 41, 42, and 43 may also be flat surfaces, for example.

There is no particular limitation to the structure of the route-regulating member 60 in the above-described second embodiment. The route-regulating member 60 may also be provided with a plurality of elastic deformation portions 65, for example.

Also, it is possible to change the shape of the inner surfaces 63A and 64A of the plate portions 63 and 64 and the inner surfaces 62A of the side wall portions 62 in conformity with the outer circumferential shape of the outer cover member 30A to which the route-regulating member 60 is to be attached. If the cross-sectional shape of the outer cover member 30A that is perpendicular to the axial direction is an oval shape, for example, the outer circumferential surfaces 30C of the outer cover member 30A are curved surfaces. In view of this, the inner surfaces 62A of the side wall portions 62 may also be curved surfaces in conformity with the shape (curved surfaces) of the outer circumferential surfaces 30C of the outer cover member 30A. Also, if the cross-sectional shape of the outer cover member 30A that is perpendicular to the axial direction is an elliptical shape, the outer circumferential surfaces 30B and 30C of the outer cover member 30A are curved surfaces. In view of this, the inner surfaces 63A and 64A of the plate portions 63 and 64 and the inner surfaces 62A of the side wall portions 62 may also be curved surfaces in conformity with the shape (curved surfaces) of the outer circumferential surfaces 30B and 30C of the outer cover member 30A.

Although the shapes of the inner surfaces 63A and 64A of the plate portions 63 and 64 and the inner surfaces 62A of the side wall portions 62 are set in conformity with the shape of the outer circumferential surface of the outer cover member 30A in the above-described second embodiment and the above-described modifications, there is no limitation to this. That is, the shapes of the inner surfaces 63A and 64A of the plate portions 63 and 64 and the inner surfaces 62A of the side wall portions 62 may also be set to shapes unrelated to the shape of the outer circumferential surface of the outer cover member 30A.

The materials of the route-regulating members 40 and 60 in the above-described embodiments are not limited to a metallic material as long as the material has a bending rigidity that is higher than those of the outer cover members 30 and 30A. It is also possible to use synthetic resin such as polyolefin, polypropylene, polyamide, polyester, or polyethylene as the materials of the route-regulating members 40 and 60, for example.

Although the fixing member 50 is provided to surround the outer side of the hinge portions 44 and 45 and the elastic deformation portion 65 in the above-described embodiments, there is no limitation to this.

Figure 11:
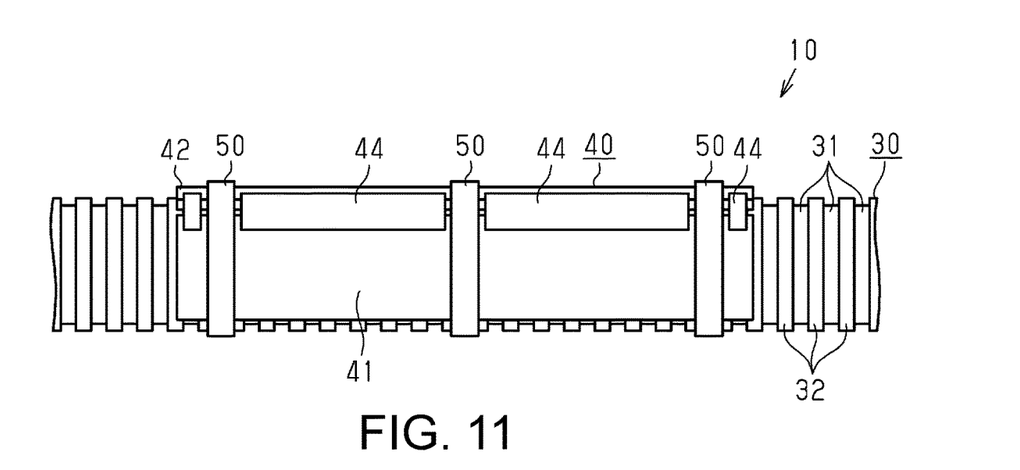
FIG. 11 is a schematic cross-sectional view showing a wire harness in a modification.

As shown in FIG. 11, for example, the hinge portions 44 and 45 need not be formed in the route-regulating member 40 at positions at which the fixing member 50 is provided. In this case, the fixing member 50 is formed to surround the outer side of the plate portions 41, 42, and 43 and the outer cover member 30. According to this configuration, it is possible to easily position the fixing members 50 due to the formation of the hinge portions 44 and 45 being omitted.

Although a cable tie made of synthetic resin is used as the fixing member 50 in the above-described embodiments, there is no limitation to this. It is also possible to use a metallic band or adhesive tape for the fixing member 50, for example. Also, it is possible to use a fixing member having a clip portion to be fixed to a vehicle body or the like, as the fixing member 50.

Although not particularly mentioned in the above-described embodiments, a configuration may also be adopted in which an electromagnetic shielding member is provided inside the outer cover members 30 and 30A. The electromagnetic shielding member may be provided to collectively enclose the plurality of wires 20 or 20A, for example. The electromagnetic shielding member is provided between the inner surfaces of the outer cover members 30 or 30A and the outer surfaces of the wires 20 or 20A, for example. It is possible to use a flexible braided wire or metal film for the electromagnetic shielding member, for example.

Although non-shielded wires are used as the wires 20 and 20A in the above-described embodiments, the types of wires 20 and 20A are not limited to this. Shielded wires having a shielding structure therein may also be used as the wires 20 and 20A, for example.

Although the wire harnesses 10 and 10A have an electromagnetic shielding function in the above-described embodiments, wire harnesses without any electromagnetic shielding function may also be used instead.

Two wires 20 and two wires 20A are respectively inserted into the outer cover members 30 and 30A in the above-described embodiments. However, there is no limitation to such a configuration, and the number of wires 20 and the number of wires 20A can be changed in accordance with the specification of the vehicle. The number of wires 20 and the number of wires 20A that are respectively inserted into the outer cover members 30 and 30A may also be one or three or more, for example. Low-voltage electrical wires that connect a low-voltage battery and various low-voltage devices (e.g., a lamp and a car audio device) may be added as wires that are inserted into the outer cover members 30 and 30A, for example.

The positional relationship between the inverter 11 and the high-voltage battery 12 in the vehicle is not limited to that in the above-described embodiments, and may be changed as appropriate in accordance with the configuration of the vehicle.

Although the inverter 11 and the high-voltage battery 12 are adopted for electric apparatuses connected to the wires 20 and 20A in the above-described embodiments, there is no limitation to this. The present disclosure is also applicable to wires that connect the inverter 11 and a wheel driving motor, for example. That is, it can be applied to any component that electrically connects electric apparatuses installed in the vehicle.

The present disclosure encompasses the following implementation examples. Not for limitation but for assistance in understanding, the reference numerals of the representative components in the representative embodiment are provided.

APPENDIX 1

A wire harness (10) according to a non-limited embodiment may include a wire (20, 20A), a bendable outer cover member (30, 30A) that is configured to cover the wire (20, 20A), has an elongated tubular shape, and is routed in a predetermined wiring route that includes a straight route portion, a route-regulating member (40, 61) that is configured to be attachable to an outer surface of the outer cover member (30, 30A), which has a predetermined length, to regulate the predetermined length of the outer cover member (30, 30A) in such a manner that the outer cover member (30, 30A) has a straight shape conforming to the straight route portion of the predetermined wiring route, and a fixing member (50) configured to fix the route-regulating member (40, 61) to the outer cover member (30, 30A), the route-regulating member (40, 61) may include first and second ends (62) forming an opening between them, and an elastic deformation portion (44, 45, 65) that enables the route-regulating member (40, 61) to reversibly elastically deform between a first shape (FIGS. 4, 8, and 9(a)) and a second shape (FIGS. 2 and 7) by changing the size of an opening, which is the distance between the first and second ends (62) of the route-regulating member (40, 61), the outer cover member (30, 30A) may have a first width in a cross-sectional view of the wire harness (10) in its longitudinal direction, the size of the opening in the route-regulating member (40, 61) having the first shape may have a first opening size that is larger than the first width in a cross-sectional view of the wire harness (10) in the longitudinal direction, and the size of the opening in the route-regulating member (40, 61) having the second shape may have a second opening size that is the same as or is smaller than the first width in a cross-sectional view of the wire harness (10) in the longitudinal direction.

It will be apparent to those skilled in the art that the present disclosure may be embodied in other specific forms without departing from the technical concept of the disclosure. Some of the components described in the embodiments (or one or more aspects thereof) may be omitted, or some of the components may be combined, for example. The scope of the present disclosure should be determined with reference to the appended claims, along with the full scope of equivalents to which such claims are entitled.

The invention claimed is:

1. A wire harness comprising:
   a wire;
   a flexible outer cover covering the wire;
   a route regulator that has an axial direction extending along a route where the wire is routed, and that is configured to regulate the route where the wire is routed, from an outside of the outer cover; and
   a fixing member that is configured to fix the route regulator to the outer cover, wherein:
   the route regulator includes an elastic deformation portion that is elastically deformable,
   the route regulator includes a plurality of plates,
   the elastic deformation portion links the plurality of plates,
   the elastic deformation portion is a hinge linking the plurality of plates,
   a portion of inner surfaces of the plates is in contact with an outer circumferential surface of the outer cover,
   the outer cover is a tubular corrugated tube, and
   an inner surface of the plates is a curved surface.

2. The wire harness according to claim 1,
wherein the route regulator has a bending rigidity that is higher than a bending rigidity of the outer cover.

3. The wire harness according to claim 1, wherein:
the route where the wire is routed includes straight routes and a curved route, and
the route regulator is fixed to the outer cover to regulate the straight routes.

4. The wire harness according to claim 1,
wherein the route regulator is fixed to the outer cover to cover a portion of an outer circumferential surface of the outer cover located in a circumferential direction of the outer cover.

5. A wire harness comprising:
a wire;
a flexible outer cover covering the wire;
a route regulator that has an axial direction extending along a route where the wire is routed, and that is configured to regulate the route where the wire is routed, from an outside of the outer cover; and
a fixing member that is configured to fix the route regulator to the outer cover, wherein:
the route regulator includes an elastic deformation portion that is elastically deformable,
the route regulator includes a main body having the elastic deformation portion, and side walls that extend vertically from two ends of the main body located in a width direction of the main body,
the elastic deformation portion has an accordion structure in which crests and troughs are formed in an alternating manner,
the main body includes a plurality of plates, and the elastic deformation portion provided between the plurality of plates, and
an inner surface of the elastic deformation portion does not protrude from inner surfaces of the plates toward the outer cover.

6. The wire harness according to claim 5, wherein:
the outer cover is a flat tubular corrugated tube, and
an inner surface of the main body and inner surfaces of the side walls are in contact with an outer circumferential surface of the outer cover.

7. The wire harness according to claim 5,
wherein the route regulator has a bending rigidity that is higher than a bending rigidity of the outer cover.

8. The wire harness according to claim 5, wherein:
the route where the wire is routed includes straight routes and a curved route, and
the route regulator is fixed to the outer cover to regulate the straight routes.

9. The wire harness according to claim 5,
wherein the route regulator is fixed to the outer cover to cover a portion of an outer circumferential surface of the outer cover located in a circumferential direction of the outer cover.

* * * * *